July 18, 1933.   F. H. TREGO   1,918,303
TABULATOR STOP
Filed March 14, 1930
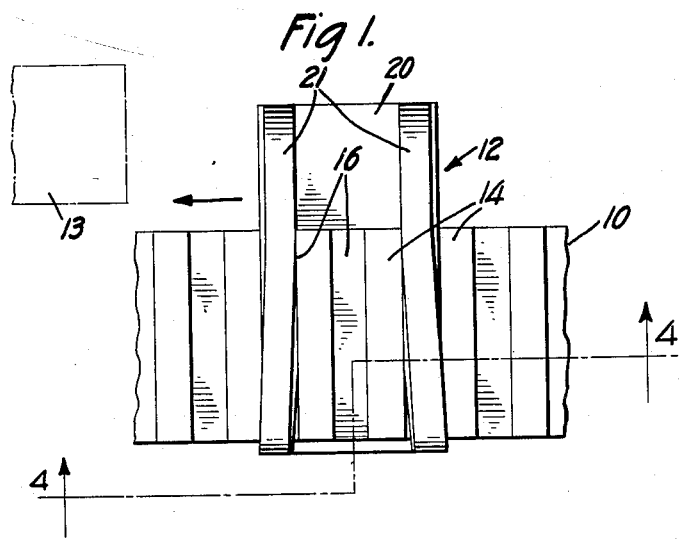
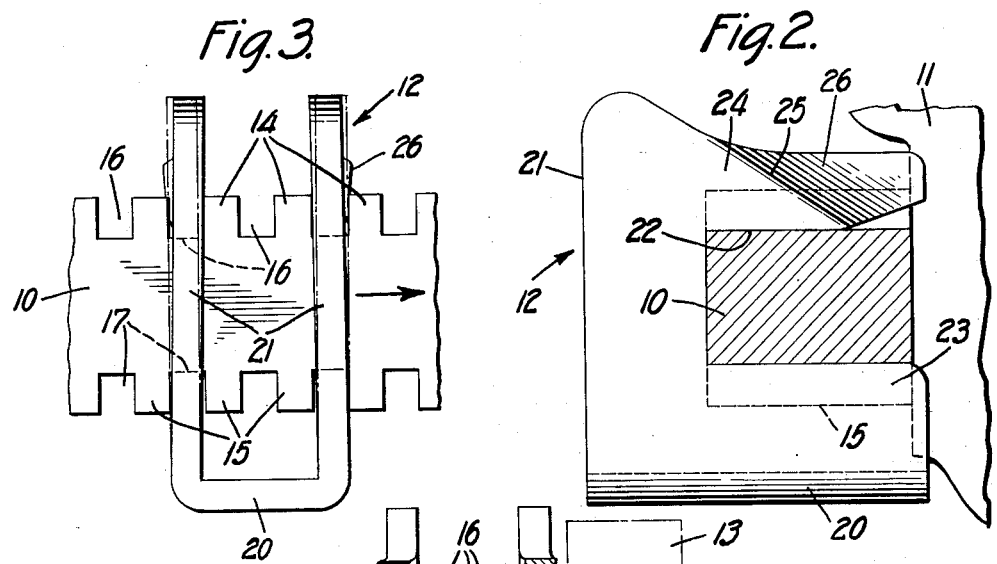
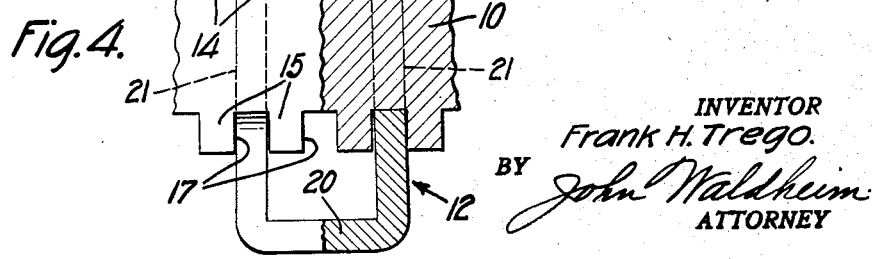
INVENTOR
Frank H. Trego.
BY John Waldheim
ATTORNEY Patented July 18, 1933

1,918,303

UNITED STATES PATENT OFFICE

FRANK H. TREGO, OF NEW YORK, N. Y., ASSIGNOR, BY MESNE ASSIGNMENTS, TO RALPH C. COXHEAD CORPORATION, OF NEW YORK, N. Y., A CORPORATION OF DELAWARE

TABULATOR STOP

Application filed March 14, 1930. Serial No. 435,707.

This invention relates to improvements in typewriting machines and more particularly to tabulator stops therefor.

An object of the invention is to provide a tabulator stop which is simple and extremely strong in construction, and which is readily attached to or removed from the stop bar of the machine.

A feature of the invention relates to means to prevent accidental displacement of the stop on the stop bar.

Other features and advantages will hereinafter appear.

In the drawing:—

Fig. 1 is a top plan view of the stop on a stop bar;

Fig. 2 is a side view of the stop positioned on the stop bar;

Fig. 3 is a rear view of the stop supported on the stop bar; and

Fig. 4 is a front section taken on the line 4—4 of Fig. 1.

Similar reference characters represent similar parts throughout the several views.

The invention is herein illustrated as applied to a Varityper writing machine which includes a stop bar 10 supported on a carriage 11 which travels in the direction of the arrow in Fig. 1; said carriage being guided in the usual manner by means, not shown.

One or more tabulator stops 12, detachably supported on the stop bar, co-operate with a counter stop 13 which is normally out of the path of the tabulator stop and which may be operated by means, not shown, which may be like that shown in my application, Serial No. 384,603, filed August 9, 1929, to move it into the path of the tabulator stop.

To locate the stop in any letter space position along the bar 10, the latter is provided with teeth 14 and 15 on opposite faces; these teeth forming transverse slots 16 and 17, respectively, on opposite faces of the bar to receive the stop.

Each tabulator stop 12 is U-shaped and comprises a cross piece 20 from which extend, vertically, two arms 21. These arms have each formed therein an open end slot 22 to embrace the stop bar 10. Each arm 21 comprises bar engaging members or portions 23 which extend transversely of the bar and into the slots between the teeth 15 on one side of the stop bar. The portion of the arm 21 above the member 23 is L-shaped, as seen in Fig. 2, and the free end 24 of each engages in the slots formed between the teeth 14 on the opposite side of the stop bar.

Each free end is bent outwardly on a diagonal 25 to form an inclined portion 26; the portions 26 being inclined to the vertical as in Fig. 4, and flaring outwardly as in Fig. 1 so as to engage the corners of the adjacent teeth 14 of the stop bar against which said portions are pressed to hold the stop against displacement on the stop bar.

The arms 21 are slightly resilient and are parallel as indicated by the dot-and-dash lines in Fig. 3 when the stop is detached from the bar. In order to attach the stop to the bar 10 it is necessary to press the upper ends of the arms 21 together so that the portions 26 of said arms may enter the slots 16 on the upper face of the stop bar; the portions 23 being spaced to readily enter the slots 17 on the lower face of the bar. It will be understood that when the stop is pushed completely on the bar 10 the arms 21 of the stop tend to spring outwardly, pressing the flaring portions 26 against the forward corners of the adjacent teeth 14 of the stop bar. Thus the stop is held against accidental displacement on the stop bar. The distance from the outside of one of the portions 26 (Fig. 1) to the outside of the other portion is greater than the distance between the two faces of the teeth against which said portions are pressing, from which it will be understood that in order to remove the stop from the bar, it is not only necessary to overcome the friction caused by the pressure of the portions 26 against the teeth 16, but the arms 21 must be forced together slightly to clear the teeth 14. To remove the stop, however, it is only necessary to draw it rearwardly from the stop bar; the arms 21 being sprung together by the action of the inclined portions 26 on the corners of the teeth 14.

It will be understood that the counter stop 13 engages the lower part of the tabulator stop 12 where the latter is provided with the cross bar 20 which acts as a re-enforcement for said stop when it receives the blow from the counter stop, which below is transmitted to the teeth 15 of the stop bar. It will further be understood that the bar 20 and the lower part of the one arm 21 serve as a brace for the other arm 21 when the latter is engaged by the counter stop.

Having thus described the invention, it should be understood that alterations and changes may be made without departing from the spirit of the invention as defined in the appended claims.

I claim:—

1. The combination of a toothed stop bar, and a U-shaped tabulator stop comprising two parallel arms, each arm having therein a slot for the stop bar, each arm engaging in oppositely disposed slots on said bar, and a diagonally disposed portion on the free end of each arm to engage the corners of the teeth of the stop bar to hold said stop against accidental displacement on the stop bar.

2. The combination of a stop bar having slots therein to form teeth, and a U-shaped tabulator stop detachably supported on said stop bar, said stop comprising two arms with slots therein to embrace said stop bar, the ends of said arms flaring to engage the teeth in a manner to prevent accidental displacement of the stop.

3. The combination of a stop bar having slots therein to form teeth, and a U-shaped tabulator stop detachably supported on said stop bar, said stop comprising two arms having slots so that said stop may be slid transversely on to the stop bar, flaring ends on said arms, said arms being resilient so that they may be sprung together so that the flaring ends may enter the slots of the stop bar and so that they may spring outwardly to cause the flaring ends to engage behind the corners of the teeth of the stop bar to prevent accidental displacement of the stop on said bar.

4. The combination of a stop bar having slots forming teeth on opposite sides thereof, and a tabulator stop detachably supported on said bar, said stop including a cross piece, two members extending vertically therefrom and engaging in the slots on one side of the stop bar, two L-shaped members, one on each vertical member, each L-shaped member having a free arm, the free arms engaging in the slots on the opposite side of the bar, and each free arm having a diagonally disposed portion, the diagonally disposed portion being effective to engage the teeth of the stop bar in a manner to prevent accidental displacement of the stop on said bar.

5. In a typewriting machine, the combination of a carriage, a stop bar thereon having transverse slots, a tabulator stop on the stop bar, and a counter stop to engage said tabulator stop, said tabulator stop being U-shaped and including two parallel arms to engage in said slots to secure the stop on the stop bar, and a cross bar extending parallel to the stop bar and joining said arms, said cross bar being located in a plane extending through the counter stop at the position where it engages the tabulator stop.

6. The combination of a toothed stop bar; and a U-shaped tabulator stop thereon, said stop including two arms engaging between the teeth of the stop bar, one of said arms having a slot to embrace the stop bar and to engage between teeth at the opposite side of the stop bar, and a member on the last mentioned arm to engage the corner of one tooth of the stop bar to hold the stop on the bar.

7. The combination of a stop bar having teeth, and a U-shaped stop detachably supported thereon, said stop including two arms with slots therein to embrace the stop bar, the end of one of said arms having a flaring portion to engage the adjacent tooth to hold the stop on the bar.

8. The combination of a carriage, a stop bar thereon, said stop bar having teeth on opposite faces thereof, a U-shaped tabulator stop on said stop bar, and a counter stop, said tabulator stop including a cross bar joining two vertically disposed arms, each arm having a slot therein so that said stop may be slid onto the stop bar, each arm engaging between the teeth at opposite sides of the stop bar, the cross bar being located at that side of the stop to be engaged by the column stop, and each arm having a member to engage the teeth of the stop bar to prevent accidental removal of the stop from said stop bar.

9. The combination of a carriage, a toothed stop bar, a column stop on said stop bar, and a counter stop to engage the column stop to arrest the carriage, said column stop comprising two arms joined at one end of the stop by a cross-piece the arms being slightly resilient so as to press laterally in opposite directions against the adjacent teeth of stop bar when said stop is on said bar.

FRANK H. TREGO.